United States Patent [19]

Anker

[11] Patent Number: 6,005,189

[45] Date of Patent: *Dec. 21, 1999

[54] INTERCHANGEABLE SECTIONAL WALLPLATES

[75] Inventor: Herbert Anker, Little Neck, N.Y.

[73] Assignee: Leviton Manufacturing Co., Inc., Little Neck, N.Y.

[*] Notice: This patent is subject to a terminal disclaimer.

[21] Appl. No.: 08/986,904

[22] Filed: Dec. 8, 1997

Related U.S. Application Data

[63] Continuation of application No. 08/374,003, Jan. 18, 1995, Pat. No. 5,696,350.

[51] Int. Cl.$^6$ ........................................................ H05K 5/03
[52] U.S. Cl. ............................. 174/66; 220/241; 220/3.8; 220/3.92
[58] Field of Search ................................ 174/66; 220/241, 220/3.8, 3.92, 3.94, 4.02; 439/557, 533, 535, 536

[56] References Cited

U.S. PATENT DOCUMENTS

| | | | |
|---|---|---|---|
| 1,717,871 | 6/1929 | Both | 220/241 |
| 4,725,249 | 2/1988 | Blackwood et al. | 439/535 |
| 4,756,695 | 7/1988 | Lane et al. | 439/535 X |
| 4,875,880 | 10/1989 | Welch et al. | 439/536 |
| 5,696,350 | 12/1997 | Anker | 174/66 |
| 5,700,978 | 12/1997 | Huff | 174/66 |

*Primary Examiner*—Dean A. Reichard
*Attorney, Agent, or Firm*—Paul J. Sutton

[57] ABSTRACT

An interchangeable wallplate assembly made up of two or more interchangeable panels which can be locked together to cover electrical devices mounted in two or more ganged gem boxes. The panels can be blank or have apertures to permit portions of the electrical devices to extend therethrough for front access. If an electrical device is changed or another is added or removed the assembly can be altered to match the new electrical device configuration. End panels each have a pawl and a loop spaced along one wall while central panels have pawls and loops spaced along both walls. Thus, end panels can be joined to themselves or to a central panel which can also be mounted to similar central panels to allow the assembly to be increased to cover any ganged gem box.

6 Claims, 5 Drawing Sheets

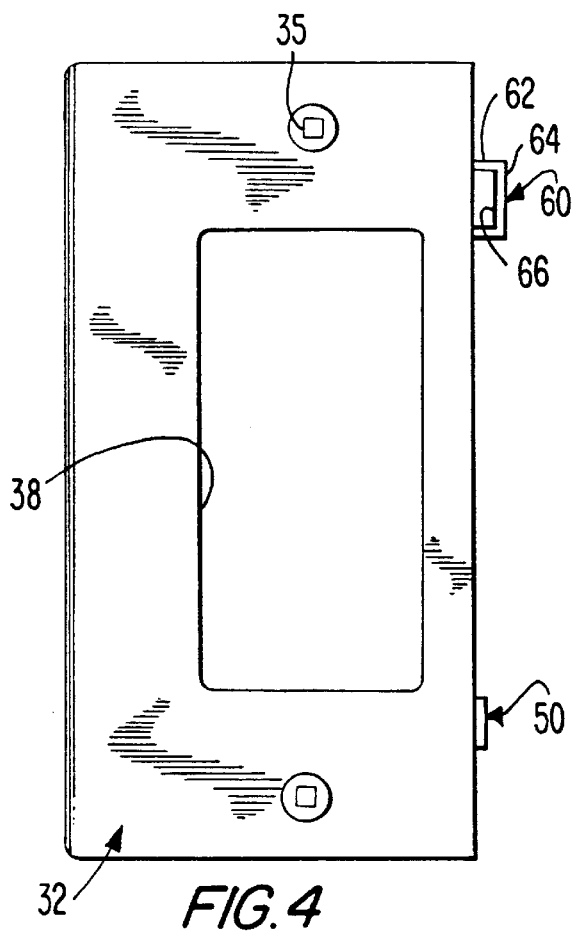
FIG. 4
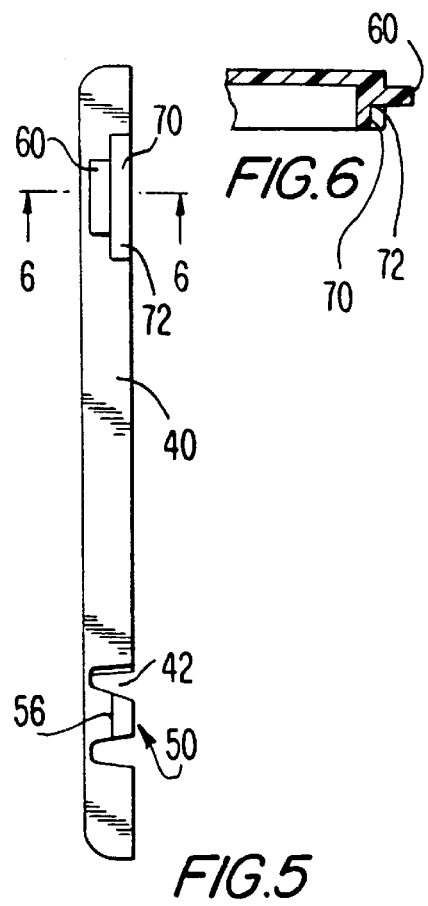
FIG. 6
FIG. 5
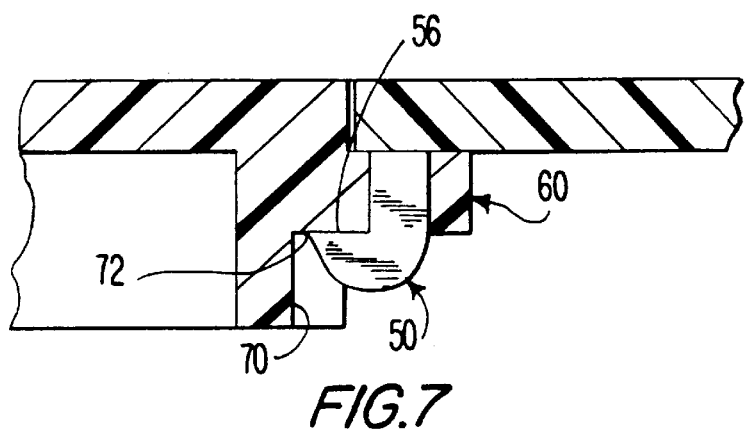
FIG. 7

6,005,189

INTERCHANGEABLE SECTIONAL WALLPLATES

This is a continuation of application Ser. No. 08/374,003 filed on Jan. 18, 1995 and now U.S. Pat. No. 5,696,350 issued Dec. 9, 1997.

BACKGROUND OF THE INVENTION

1. Field of the Invention

The invention is directed to wall plates to cover electrical devices mounted in ganged gem boxes and more particularly to a wallplate made up of a plurality of sections which can be combined to match the electrical devices mounted in such ganged gem boxes.

2. Description of the Prior Art

At present, wall plates to cover electrical devices mounted in gem boxes are made in sizes to match the number of gem boxes in use from a single box to three or four ganged gem boxes. In addition, the wallplates must have apertures therethrough so that front access is possible to each type of electrical device in use. At present the apertures include an aperture for a rocker-type switch, an aperture for a toggle-type switch, for a round single receptacle, and for a duplex receptacle as well as a blank. There are also composite wallplates, for example, where there is one toggle-type switch aperture and one-half of a duplex receptacle aperture. To stock all possible combinations of electrical device apertures for all possible locations for a variable number of ganged gem boxes is very difficult and expensive and requires a large inventory of wallplates to be available at all times. Any change in the electrical devices in the ganged gem boxes requires a new wallplate.

SUMMARY OF THE INVENTION

The present invention overcomes the difficulties set out above with respect to prior art wallplates. The invention employs end panels and central panels which can be interchanged, as desired, to create a wall panel assembly for each configuration of electrical devices in any number of ganged gem boxes. The end panels have a smooth, curved top, bottom and one side wall. The other side wall is perpendicular to the panel body and contains spaced apart locking hook and clasp. The central panel has smooth curved top and bottom walls and side walls perpendicular to the panel body. Each of these side walls contains spaced apart locking hook and locking clasp. End panels can be locked to each other or to a central panel by engaging the locking clasp on one side with a locking hook on an associated end or central panel side and the locking hook on the same side with the locking clasp of the associated end or central panel. In the case of a central panel, additional central panels can be joined in a chain arrangement and each exposed side wall terminated with an end panel. By providing end panels and central panels with the desired apertures, the panels can be combined to match the electrical devices to be covered. The wallplate assembly can thereafter be changed to match any change in the electrical devices or ganged gem boxes. It is an object of this invention to provide a novel wallplate assembly made up of at least two interchangeable panels.

It is another object of this invention to provide a novel wallplate assembly made up of at least two interchangeable panels which can be altered as desired.

It is another object of the invention to provide a novel wallplate assembly whose individual panels can be locked together using a novel locking hook and locking clasp locking system.

It is still another object of the invention to provide a novel wallplate assembly whose individual panels can be selectively locked or unlocked from each other using a novel locking hook and locking clasp locking system.

It is yet another object of this invention to provide a novel wallplate assembly employing interchangeable panels having apertures therethrough for access to electrical devices behind said wallplate assembly.

Other objects and features of the invention will be pointed out in the following description and claims and illustrated in the accompanying drawings, which disclose, by way of example, the principles of the invention and the best mode which is presently contemplated for carrying them out.

BRIEF DESCRIPTION OF THE DRAWING

In the drawing in which similar elements are given similar reference characters:

FIG. 4 is a top plan view of the end panel of FIG. 1.

FIG. 5 is a side elevational view of the end panel of FIG. 4.

FIG. 6 is a fragmentary portion of the end panel of FIG. 5, partially in section, taken along the line 6—6 in FIG. 5.

FIG. 7 is a fragmentary portion of a side elevation the two end panels of FIG. 3 locked to one another and shown partially in section.

DESCRIPTION OF THE PREFERRED EMBODIMENTS

Figure 1:
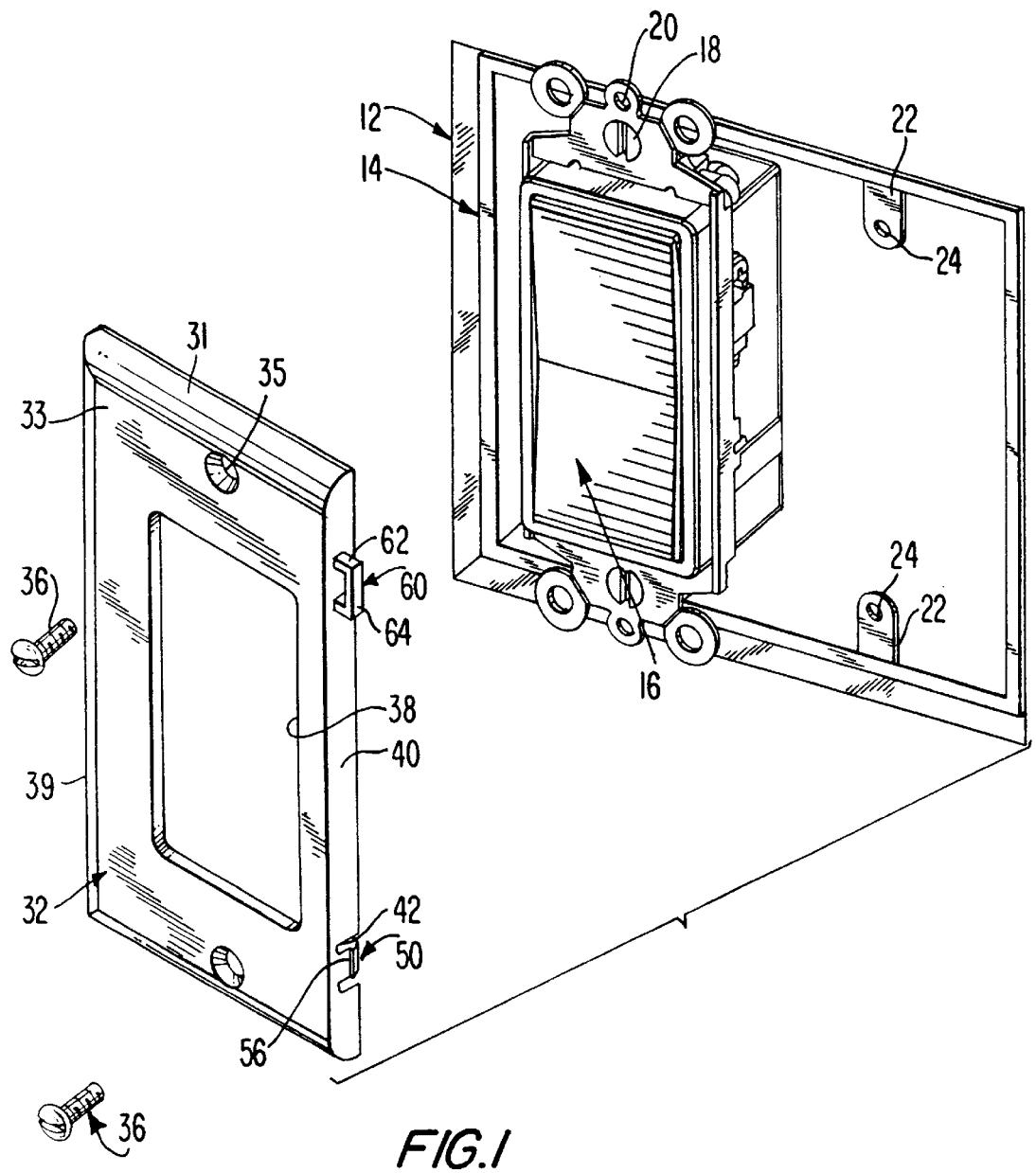
FIG. 1 is an exploded perspective view of a rocker-type switch mounted in a double ganged gem box with the method of mounting thereover an end panel constructed in accordance with the concepts of the invention.
Figure 2:
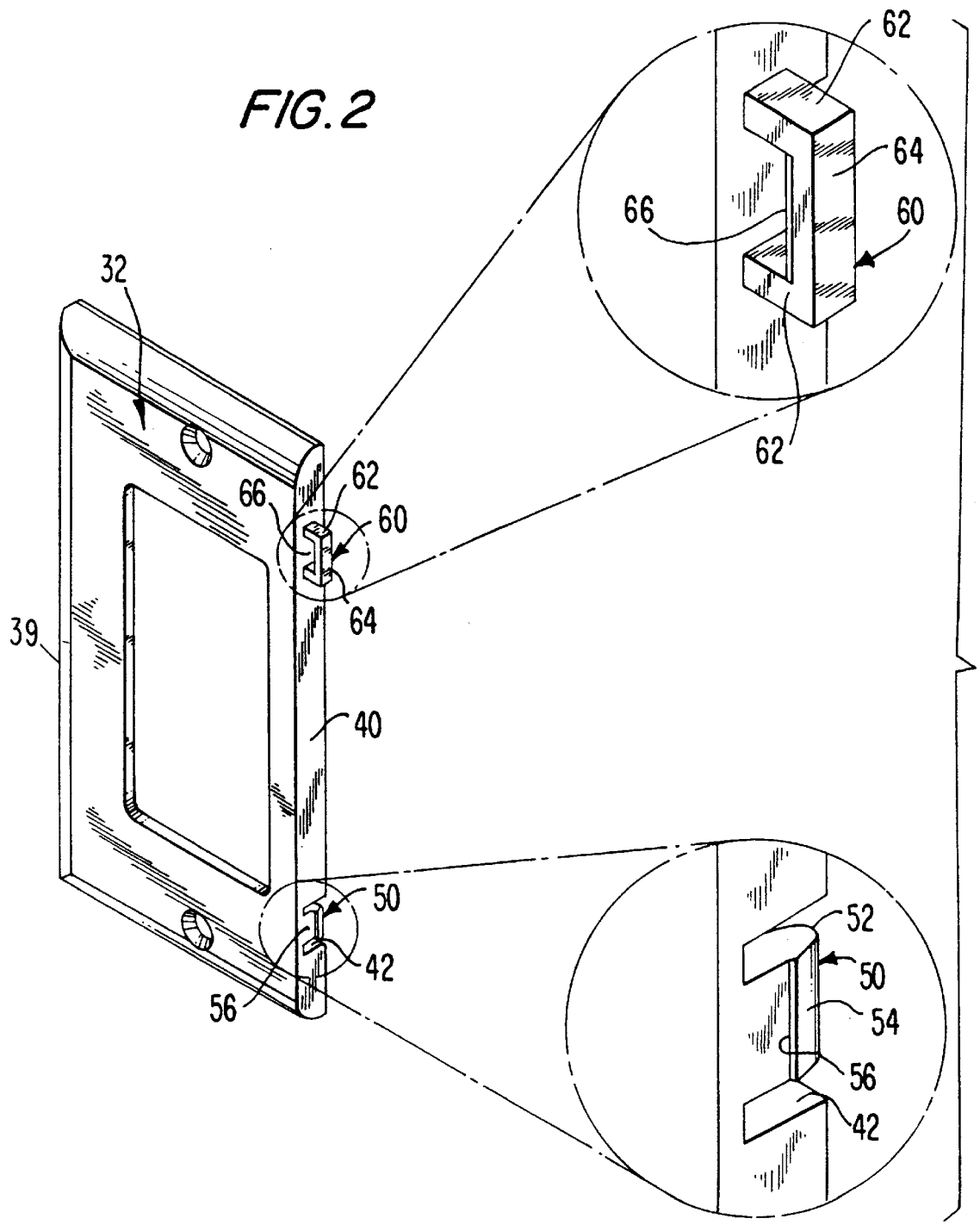
FIG. 2 is a perspective view of the end panel of FIG. 1 with enlargements of the locking clasp and locking hook of such end panel.

Turning now to FIGS. 1 to 10 an interchangeable sectional wallplate assembly 30 is shown. FIG. 1 shows an end panel 32 which may be locked to an inverted end panel 34 (see FIG. 3) to form a wallplate assembly to cover the double ganged gem box 14 of FIG. 1. In FIG. 1 the wall 12 has been cut and a double ganged gem box 14 has been installed to the wall 12 or to studs behind wall 12 employing fasteners (not shown). A rocker-type switch 16 is installed to the depending ears (not shown) using mounting screws 18. The switch 16 has threaded apertures 20 which receive mounting screws 36 which pass through apertures 35 in panel 32 to anchor end panel 32 to the switch 16. Panel 32 has a cut-out or aperture 38 to permit the toggle portion of switch 16 to extend beyond the front face 33 of panel 32 so that it can be easily accessed. Panel 32 has a top wall 31, a bottom wall 37 and an outside wall 39 which all meet front face 33 at rounded edges. A second inside wall 40 extends perpendicular to panel 32 and meets front face 33 at right angles.

Figure 9:
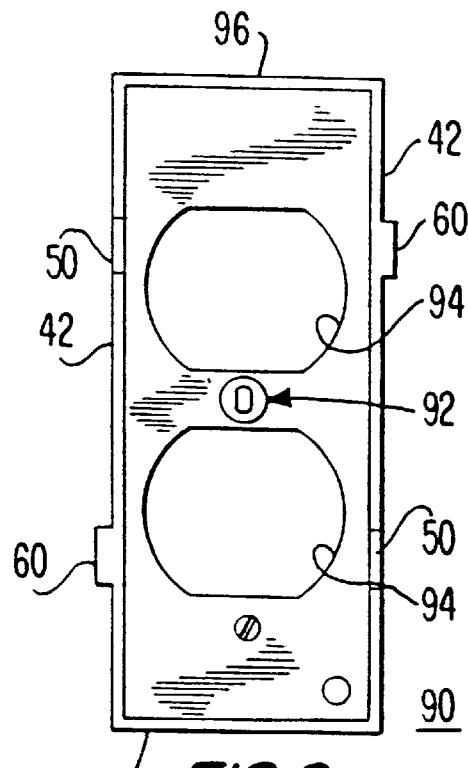
FIG. 9 is a top plan view of a central panel, according to the present invention having apertures for a duplex receptacle.
Figure 10:
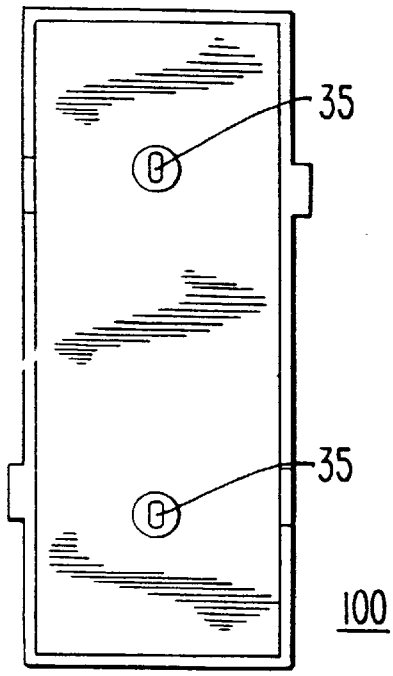
FIG. 10 is a top plan view of a central panel, according to the present invention, without any aperture, commonly referred to as blank.

A second electrical device can be placed in gem box 14 and attached to the mounting ears 22 by means of mounting screws 18 engaging the threaded apertures 24 in the ears 22. If such second device is also a rocker-type switch, the second end panel 34 (see FIG. 3) will have a cut-out or aperture 38 the same as end panel 32. Panel 34 will also have a top wall 31, a bottom wall 37 and an outside side wall 39 with rounded corners and a generally flat inside side wall 40 meeting the front face 33 at a right angle. However, end panel 34 need not have the same type of aperture as panel. The panel could be blank as shown by panel 100 in FIG. 10, wherein only mounting screw apertures 35 are present. The could also have an aperture 84 to receive a toggle-type switch as shown by panel 80 in FIG. 8. Panel 80 also contains mounting apertures 35. Panel 90 in FIG. 9 shows the dual apertures 94 to receive the two portions of a duplex receptacle, and a single central aperture 92 to receive a mounting screw.

Returning to FIGS. 1 and 2 the locking devices used to hold in assembly two or more interchangeable panels are shown. A locking hook 50 is formed in side wall 40 by two slots 42. The free end of locking hook 50 is rounded 52 and formed with an outwardly tapered surface 54 which terminates in a locking ridge 56 generally parallel with panel 32 front face 33. A locking clasp 60 is formed in the same side wall 40 and extends generally perpendicular to side wall 40 and spaced along said side wall 40 a distance from locking hook 50. The locking clasp 60 has two parallel spaced apart legs 62 which extend perpendicularly from side wall 40. The legs 62 fit snugly in the two slots 42 that delineate the locking hook 50. Joining the two legs 62 at their free ends is cross member 64 which with legs 62 and side wall 40 define a closed slot 66. The width of slot 66 between side wall 40 and the inside surface of cross member 64 is smaller than the thickness of locking hook 50 at its outwardly tapered surface 54 so that the locking hook 50 cannot fully enter slot 66 without additional force being exerted.

Turning now to FIGS. 5, 6 and 7 the locking system for the interchangeable sectional wall plate assembly is described. Below the locking clasp 60, in side wall 40 is formed a recess 70 which has an upper wall 72 formed in line with the underside of locking clasp 60. Upper wall 72 acts as a stop surface which is engaged by locking ridge 56 of locking hook 50.

As stated above the locking hook 50 enters the slot 66 to a limited degree. By pushing down on panel 32 while pushing up on panel 34 adjacent the mated locking hook 50 and locking clasp 60, the width of the slot 66 is increased so that the entire thickness of the locking hook 50 at outwardly tapered surface 54 passes thorugh slot 66. This continues until legs 62 bottom out in slots 42 and the thinner portion of locking hook 50 is in slot 66 permitting locking ridge 56 of locking hook 50 to engage upper wall 72 of recess 70 locking the panels 32 and 34 together.

Figure 3:
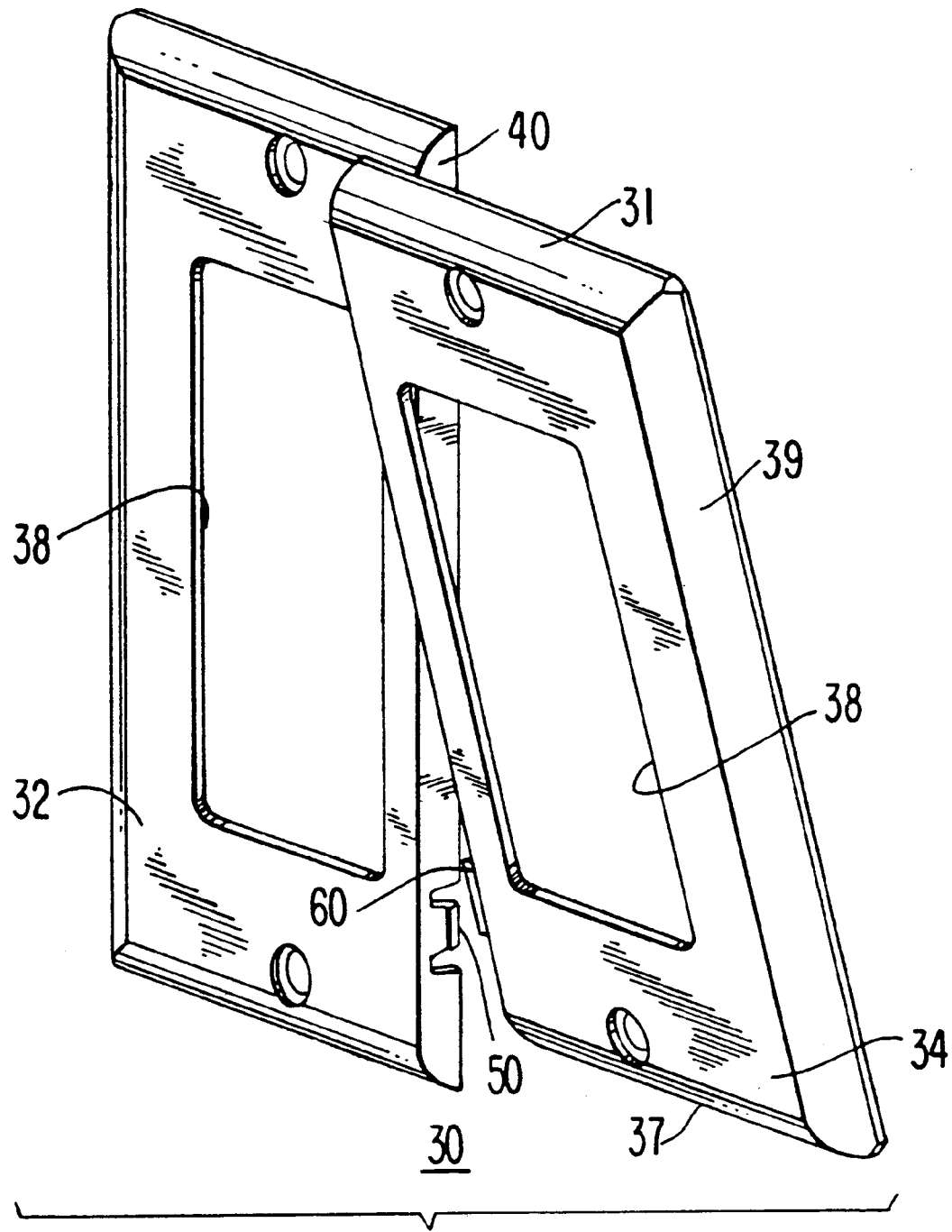
FIG. 3 is a perspective view of two end panels constructed in accordance with the concepts of the invention in a position prior to engagement of the locking hooks and locking clasps.
Figure 8:
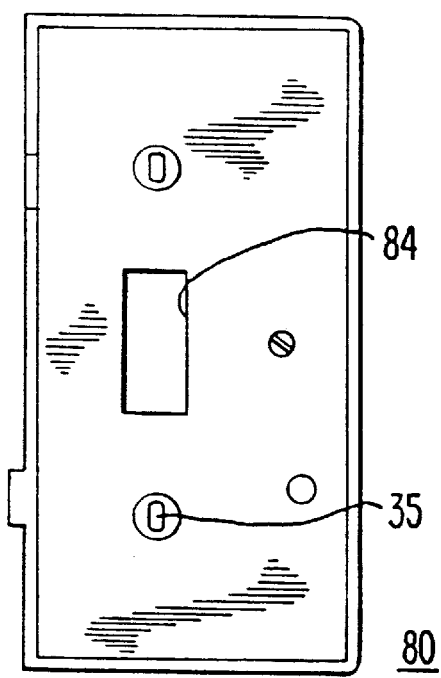
FIG. 8 is a top plan view of an end panel, according to the present invention, having a toggle-type switch aperture.

To engage both sets of locking members of the panels 32 and 34 the method illustrated in FIG. 3 is employed. Panels 32 and 34 are set with side walls 40 facing each other and panels 32 and 34 are positioned as an X. Panels 32 and 34 are rotated, panel 34 clockwise and panel 32 counter clockwise, with side walls 40 in contact until each of the locking hooks 50 enter a corresponding slot 66. Then the top end of panel 34, adjacent the locking hook 50 and locking clasp 60, is pushed downwardly towards panel 32 while the bottom end of panel 32, adjacent the locking hook 50 and locking clasp 60, is pushed downwardly towards panel 34 until the locking ridges 56 of locking hooks 50 engage the upper wall 72 of the recesses 70. The panels 32 and 34 may be released and separated by rotating the panels 32 and 34 in opposite directions.

Where the number of ganged gem boxes employed are three or more, then one or more central panels 32, 34 can be inserted between the end panels just described. Panel 90 as shown in FIG. 9 has two perpendicular side walls 40 each meet the front face of panel 90 at right angles and each of which has a locking hook 50 and a locking clasp 60. The central panel 90 has a top wall 96 and a bottom wall 98 which meet the front face of panel 90 with rounded corners. The central panel 90 can have an end panel 32, 34 installed at each side wall 40 or may be attached to other central panels with the wallplates completed by adding end panels 32, 34 at each end of the assembled central panels.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A wallplate assembly having at least a first and a second interchangeable sections, each section comprising:

a) a panel having at least one mounting aperture therethrough from a front face to a rear face to permit said panel to be mounted to an electrical device;

b) said panel having a top portion, a bottom portion and a first side wall, said top portion, said bottom potion and said first side wall each meeting said panel front fact at a rounded edge;

c) said panel having a second side wall having a free end and extending at a right angle to said front face of said panel;

d) at least one electrical device aperture in each of said panels, to permit access to an operating member of an electrical device over which said panel is placed;

e) locking clasp means on said second side wall; and f) locking hook means on said second side wall spaced from said locking clasp means, said locking hook means on said first interchangeable section to hold said first and second sections together, said locking hook means being formed by two slots and having a rounded surface thereon terminating in a locking ridge.

2. A wall plate assembly, as defined in clam 1, wherein said at least one electrical device aperture is so positioned and dimensioned to permit a portion of an associated wiring device over which one of said panels is placed to extend through said one of said panels and beyond the front face of said one of said panels.

3. A wallplate assembly, as defined in claim 1, wherein said at least one electrical device aperture is made to match with an electrical device selected from the group of a rocker switch, a toggle switch, a single circular receptacle and a duplex receptacle.

4. A wallplate assembly, as defined in claim 1, wherein said clasp means and said hook means are so positioned and dimensioned that two adjacent panels when joined have their front faces extending in a common plane.

5. A wallplate assembly, as defined in claim 1, wherein said clasp means and said hook means are so positioned and dimensioned that two adjacent panels when joined closely abut each other.

6. A wallplate assembly, as defined in claim 5, wherein said clasp means and said hook means are so positioned and dimensioned that two adjacent panels when joined have their front faces extending in a common plane.

* * * * *